3,104,208
RESTRICTOCIN
Birger H. Olson, Clifford L. Harvey, and Alton J. Junek, all of Lansing, and Jay C. Jennings, Haslet, Mich., assignors to the State of Michigan
No Drawing. Filed Sept. 6, 1960, Ser. No. 53,880
4 Claims. (Cl. 195—80)

The present invention relates to a new product which has been designated restrictocin and the preparation of the same.

The restrictocin of the present invention is produced by fermentation of an organism discovered as a contaminate of a species of mushroom grown in the soil of the State of Michigan. The organism has been designed as MDH 13462L by the Michigan Department of Health located in Lansing, Michigan. A culture of MDH 13462L has been deposited with the U.S. Department of Agriculture, Northern Utilization Research and Development Division located in Peoria, Illinois, and has been assigned the numerical designation NRRL 2869. Present investigations show the restrictocin producing organism to be a strain of *Aspergillus restrictus* having the characteristics of this organism as set forth in the "Manual of Aspergilli," by Thom and Raper as reported on page 141 by G. Smith. All measurements were found to be similar, except for a slight difference in the width of the sterigmata, the width as measured on culture NRRL 2869 was found to be 5.8 microns, whereas that of G Smith, supra, was reported as 2.5 to 3 microns. Colonies of culture NRRL 2869 were found to be unique, however, in their characteristic of sectoring including frequent multiple sectoring in individual colonies. Colorwise, the colonies of NRRL 2869 were found more brown in color than normal but otherwise quite typical, the colony colors of NRRL 2869 beginning with a dark dull green which gradually becomes more brown in appearance as the culture becomes older. Also, the colonies were found to become wrinkled with age. The growth of culture NRRL 2869 was found to be much reduced on regular Czapek's agar, to grow better on regular Czapek's agar with 20% sucrose, and to grow more luxuriously on potato dextrose agar.

Fermentation of NRRL 2869 is carried out in submerged form with agitation and aeration in an aqueous nutrient medium containing a standard carbon source and a nitrogen source. With temperatures of around 30° C. fermentation is completed in approximately two days. The restrictocin produced during fermentation is recovered from the beer, after filtering off the insoluble material, by adsorption on a phosphate buffered carboxylic ion exchange resin prepared as described in detail below, followed by elution with acid such as 1 N HCl, or the like, or 1 N $NH_4OH$. When the HCl is used for elution from the carboxylic resin, the eluate is dialyzed to remove mineral salts. When the $NH_4OH$ is used for elution from the carboxylic resin, the eluate is preferably purified by passing through hydrogen form sulfonic resin as described below. In either case, the restrictocin is then recovered from the eluate as a dry product by freeze-drying.

Restrictocin produced as described above is soluble in water, dilute hydrochloric acid, and physiological saline. Measurable amounts of the freeze-dried material do not extract into methanol, butanol, ethyl ether or ethyl acetate.

The stability of restrictocin at various pH values and temperatures can be illustrated by the following table.

TABLE

*Stability in Culture Filtrate*

| pH | 50° C., minutes stable | 100° C., minutes stable |
|---|---|---|
| 2.0 | >30 | 5 |
| 4.0 | >30 | 5 |
| 7.0 | 5 | <5 |
| 10.0 | <5 | <5 |

Chemically, the restrictocin product prepared as described above and in the examples below, gives positive Molisch, sulfhydryl sulfur, ninhydrin and biuret tests and negative starch and xanthoproteic tests. The product is not inactivated by pepsin and does not dialyze through a cellophane membrane. The restrictocin product can be readily adsorbed on activated carbon as well as on strongly basic (I.R. 401 OH form) ion exchange resins and can be eluted with 4% sodium chloride.

The following examples will service to illustrate the invention.

EXAMPLE I

| | Percent w./v. |
|---|---|
| Soybean meal | 2 |
| Corn meal | 2 |
| Corn steep liquor | 1 |
| $CaCO_3$ | 0.5 |
| Peptone | 1 |
| Anti-foam (lard oil with 3% octadecanol) | 0.5 | pH not adjusted, but is in the range of 6.5–7.0.

The soybean meal, corn meal, corn steep liquor, $CaCO_3$, peptone and anti-foam agent are mixed with water to provide the proportions noted above and then sterilized with steam. The resulting sterile medium is next inoculated with a culture of NRRL 2869 organism described above and allowed to grow under controlled temperature at about 30° C. with agitation and aeration (0.25 to 0.5 volume of air/volume of medium per minute) for about 48 hours.

At the end of this period the fermented broth is press-filtered to remove mycelium and other insoluble material. These materials can be discarded as the desired active material is water-soluble and is present in the resulting filtrate.

A cationic carboxylic exchange resin (Amberlite IRC–50) is first regenerated in the sodium form by mixing 1 volume of exchange resin with about 10 volumes of 4% (1 N) sodium hydroxide. The resin is next separated from the alkaline solution, washed with distilled water and suspended in water. To this suspension sufficient concentrated phosphoric acid is then added with stirring to provide the aqueous medium with a pH of about 7. The resulting resin which may be termed to be in phosphate buffered form is finally separated from the solution and after washing with 5 volumes of water is ready for use as noted below.

The filtrate containing the active material described above is added to a column containing the phosphate buffered exchange resin prepared as described above. With a flow rate per minute of about 0.2 ml. filtrate/1 ml. resin, one volume of resin will remove the active material from about 65 volumes of filtrate. The resin column containing the active material is then washed with 2 volumes (based on resin) of distilled water. The material is then eluted from the column with 1 N HCl. The volume of eluate which contains the active material is about 1/30 the volume of the original filtrate. For example, if the active material from 10 liters of filtrate is adsorbed on the column, the active material after elution from the column may be contained in about 330 ml. of eluate. The eluate has a pH of about 6.

The acidic eluate with the active material is next dialyzed using a cellophane membrane. After dialysis, the pH is adjusted to 6.5 with dilute NaOH and the resulting solution is then freeze-dried to yield the desired restrictocin as a fluffy tan product.

EXAMPLE II

This example follows the procedure of Example I, except that in place of acid, the active material is eluted from the column containing the phosphate buffered resin with $NH_4OH$ (approximately 1 N), using the same elution volume as with the HCl. The alkaline eluate containing the active material is then passed through a hydrogen form sulfonic resin (Amberlite 1R–120) to remove mineral salts. The eluate is freeze-dried as before to yield restrictocin as a fluffy tan product.

The nutrient medium used to grow NRRL 2869 for the production of restrictocin contains, as noted above, available carbon and nitrogen. As for carbon, various sources such as the starches, sugars such as glucose, can be employed. Proteins and amino acids may serve to provide both carbon and nitrogen. As for nitrogen, investigations show that the nitrogen should be present in amino acid or available amino acid type forms such as the soybean meal, peptone, peptides and the like. Other illustrative media that can be used in the present invention are as follows:

| | Percent w./v. |
|---|---|
| Whole wheat flour | 2 |
| Soybean meal | 2 |
| Corn steep liquor | 1 |
| $CaCO_3$ | 0.5 |
| Corn starch | 2 |
| Meat extract | 1 |
| Peptone | 1 |
| NaCl | 0.5 |
| Corn starch | 1 |
| Peptone | 1 |
| Glucose | 2 |
| Whole wheat | 2 |
| Tryptone | 1 |
| $CaCO_3$ | 0.5 |
| Glucose | 2 |
| Soybean meal | 1 |
| Corn steep liquor | 2 |

The concentrations in the media can vary and optimum amounts can be readily ascertained by preliminary test.

The restrictocin product of the present invention, like the alpha sarcin product described in the copending application of Birger H. Olson, Serial No. 41,795, filed July 11, 1960, is of the polypeptide type. That the two products, however, are not the same can be illustrated by the following. Restrictocin, unlike alpha sarcin, is not inactivated by pepsin. The amino acid make-up of the two products is also not the same. Hydrolysis of restrictocin, for example, with HCl by the procedure described in the Olson application, supra, yields the following amino acids.

| | |
|---|---|
| Alanine | Cystine |
| Aspartic acid | Glutamic acid |
| Glycine | Valine |
| Histidine | |
| Lysine | |
| Leucine | |

The three amino acids in the second column were not found in alpha sarcin, and serine and methionine found in alpha sarcin were not found in restrictocin. While both products, alpha sarcin and restrictocin, were found to contain C, H, N, O and S, further differences in the products is illustrated by the following analyses, made by the Clark Microanalytical Laboratory of Urbana, Illinois, where restrictocin was found to contain about 43.11% carbon, about 6.32% hydrogen, about 15.65% nitrogen, about 0.74% sulfur and about 21.55% oxygen. Based on this determination, the appropriate empirical formula for restrictocin is $C_{156}H_{270}O_{58}N_{49}S$.

The restrictocin prepared as described above exhibits characteristic absorption bands in the infared region of the spectrum when compressed in a KBr pellet containing 5 mg. of restrictocin per 100 mg. KBr, at the following frequencies expressed in microns: 2.85–3.0, 3.35, 6.0, 6.40, 6.90, 7.12, 7.95–8.15 and a broad band at 9.30. This data also characterizes restrictocin to be chemically different than alpha sarcin.

Restrictocin, like alpha sarcin, was found to be nonreactive against all bacterial species and strains tested. See Olson application, supra. As for fungistatic activity, restrictocin was found to have some inhibitor action against a very few fungi (unidentified), but not to have any inhibitor action against common fungi such as *Aspergillus niger*. Restrictocin is different from any of the antibiotics of the aspergilli described in the Spector, Handbook of Toxicology, vol. II (Antibiotics), because these old antibiotics either are soluble in acetone or other like oragnic solvents and/or they are active against bacteria. Restrictocin is not active against any of the bacteria listed in Spector and it is not soluble in acetone or like organic solvents.

The restrictocin product of the present invention has been found to have anti-tumor activity in certin induced tumors (sarcoma and carcinoma) in animals. This activity has been substantiated by Wisconsin Alumni Research Foundation, Stanford Research Foundation, Southern Research Institute and Sloane Kettering Institute for Cancer Research.

The animals used in the laboratory for carrying out initial anti-tumor tests of the above type, e.g. in accordance with NIH procedures, are, for the most part, mice. Large colonies of mice are required for this work and the valuable breeders, which are essential for maintaining the colony, are of utmost importance. In the investigations carried out in the anti-tumor field, at the Michigan Department of Health, it was noted that breeders develop naturally occurring mammary tumors known as adenocarcinoma, resulting in the loss of breeder mice. Injection introperitoneally into the tumor-bearing mice of 1 ml. of an aqueous solution of restrictocin containing 0.1 mg. restrictocin/ml., daily for ten days, was found to stop the mammary tumors from increasing in size for relatively long periods of time after treatment. During this period it was also found that the treated breeder mice could and would continue to breed and build up and maintain the colony.

It is claimed:

1. A process for the production of restrictocin which comprises cultivating the organism NRRL 2869 in an aqueous nutrient medium containing a source of carbon and available amino acids as a source of nitrogen, and then recovering the restrictocin from the resulting fermented broth.

2. A process of claim 1 where the restrictocin in the broth is adsorbed on a phosphate buffered carboxylic ion exchange resin, the resin is eluted with hydrochloric acid, the resulting eluate is dialyzed to remove mineral salts and the salt-free solution is freeze-dried to recover restrictocin.

3. A process of claim 1 where the restrictocin in the broth is adsorbed on a phosphate buffered carboxylic ion exchange resin, the resin is eluted with ammonium hydroxide, the resulting eluate is passed through a hydrogen form sulfonic resin to remove mineral salts, and the salt-free solution is freeze-dried to recover restrictocin.

4. The product produced by the process of claim 1, said product being soluble in water and insoluble in methanol, butanol, ethyl ether and ethyl acetate, being characterized by positive Molisch, sulfhydril sulfur, ninhydrin and biuret tests and negative starch and xanthoproteic tests and by exhibiting characteristic absorption bands in the infrared region of the spectrum in a KBr pellet (5 mg. restrictocin/100 mg. KBr), at the following frequencies expressed in microns: 2.85–3.0, 3.35, 6.0, 6.40, 6.90, 7.12, 7.95–8.15 and a broad band at 9.30, said product being composed of C, H, N, O and S.

No references cited.